US011277352B2

(12) United States Patent
Xiang et al.

(10) Patent No.: US 11,277,352 B2
(45) Date of Patent: Mar. 15, 2022

(54) METHOD, APPARATUS, AND SERVER FOR DYNAMICALLY ADJUSTING RESOURCE COMPETITION THRESHOLDS

(71) Applicant: TENCENT TECHNOLOGY (SHENZHEN) COMPANY LIMITED, Guangdong (CN)

(72) Inventors: Zhuolin Xiang, Guangdong (CN); Zhengyong Zou, Guangdong (CN); Ruichao Shi, Guangdong (CN); Xuekai Li, Guangdong (CN); Qiyun Su, Guangdong (CN); Shifei Lin, Guangdong (CN); Yan Zhao, Guangdong (CN); Lei Huang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 145 days.

(21) Appl. No.: 16/384,203

(22) Filed: Apr. 15, 2019

(65) Prior Publication Data
US 2019/0280987 A1    Sep. 12, 2019

Related U.S. Application Data

(63) Continuation of application No. PCT/CN2017/115019, filed on Dec. 7, 2017.

(30) Foreign Application Priority Data

Dec. 29, 2016 (CN) .......................... 201611245646.1

(51) Int. Cl.
*H04L 12/911* (2013.01)
*H04L 47/70* (2022.01)
(Continued)

(52) U.S. Cl.
CPC ....... *H04L 47/70* (2013.01); *G06Q 10/06312* (2013.01); *G06Q 30/0275* (2013.01); *G06Q 50/01* (2013.01)

(58) Field of Classification Search
CPC .............. H04L 47/70; G06Q 10/06312; G06Q 30/0275; G06Q 50/01
See application file for complete search history.

(56) References Cited

U.S. PATENT DOCUMENTS 8,473,347 B1 * 6/2013 Koningstein .......... G06Q 30/02
                                                   705/14.43
2006/0122879 A1 * 6/2006 O'Kelley ........... G06Q 30/0254
                                                   705/14.46
(Continued)

FOREIGN PATENT DOCUMENTS

| CN | 105338649 A | 2/2016 |
|----|-------------|--------|
| CN | 106096999 A | 11/2016 |
| CN | 107067142 A | 8/2017 |

OTHER PUBLICATIONS

Chinese Written Opinion dated Mar. 7, 2018 in Application No. PCT/CN2017/115019 (no English translation), 4 pages.
(Continued)

*Primary Examiner* — Philip J Chea
*Assistant Examiner* — Wuji Chen
(74) *Attorney, Agent, or Firm* — Oblon, McClelland, Maier & Neustadt, L.L.P.

(57) ABSTRACT

A method of adjusting a resource competition threshold for qualifying resource competition participants in resource competition is described. Processing circuitry of an apparatus obtains first competition data associated with a first time period, obtains a first optimal threshold according to the first competition data, and set the resource competition threshold according to the first optimal threshold. The processing circuitry obtains second competition data associated with a (Continued)

second time period, and obtains a second optimal threshold according to the second competition data. When a difference between the second optimal threshold and the resource competition threshold is greater than a difference threshold, the processing circuitry obtains third competition data and updates the resource competition threshold according to the third competition data.

20 Claims, 5 Drawing Sheets

(51) Int. Cl.
*G06Q 30/02* (2012.01)
*G06Q 10/06* (2012.01)
*G06Q 50/00* (2012.01)

(56) References Cited

U.S. PATENT DOCUMENTS

| | | | | |
|---|---|---|---|---|
| 2009/0030829 | A1* | 1/2009 | Chatter | G06Q 40/025 705/37 |
| 2010/0241511 | A1* | 9/2010 | Cunningham | G06Q 30/0247 705/14.46 |
| 2013/0097028 | A1* | 4/2013 | Han | G06Q 30/02 705/14.71 |
| 2013/0205339 | A1* | 8/2013 | Haberman | H04N 21/44204 725/35 |
| 2014/0058849 | A1* | 2/2014 | Saifee | G06Q 30/0275 705/14.71 |
| 2014/0222590 | A1* | 8/2014 | Chatter | G06Q 30/0272 705/14.71 |
| 2014/0256326 | A1* | 9/2014 | Morgan | H04W 36/0016 455/437 |
| 2014/0297400 | A1* | 10/2014 | Sandholm | G06Q 30/0243 705/14.42 |
| 2014/0337120 | A1* | 11/2014 | Ercanbrack | G06Q 30/0244 705/14.43 |
| 2014/0338120 | A1* | 11/2014 | Baugh | A47C 17/62 5/3 |
| 2014/0355557 | A1* | 12/2014 | Peng | H04L 5/0091 370/330 |
| 2014/0379473 | A1* | 12/2014 | Zhou | G06Q 30/0256 705/14.54 |
| 2015/0088665 | A1* | 3/2015 | Karlsson | G06Q 30/0275 705/14.71 |
| 2015/0142557 | A1* | 5/2015 | Krishnamurthy | G06Q 30/0241 705/14.45 |
| 2015/0178790 | A1* | 6/2015 | Yi | G06Q 30/0273 705/7.31 |
| 2015/0332349 | A1* | 11/2015 | Els | G06Q 30/0244 705/14.71 |
| 2016/0275570 | A1* | 9/2016 | Seljan | G06Q 30/0275 |
| 2016/0283974 | A1* | 9/2016 | Sodomka | G06Q 30/0275 |
| 2017/0034594 | A1* | 2/2017 | Francis | H04N 21/23424 |
| 2019/0052922 | A1* | 2/2019 | Yang | G06Q 30/0277 |

OTHER PUBLICATIONS

International Search Report dated Mar. 7, 2018 in Application No. PCT/CN2017/115019 (with English translation), 6 pages.

* cited by examiner

METHOD, APPARATUS, AND SERVER FOR DYNAMICALLY ADJUSTING RESOURCE COMPETITION THRESHOLDS

RELATED APPLICATION

This application is a continuation of International Application No. PCT/CN2017/115019, filed on Dec. 7, 2017, which claims priority to Chinese Patent Application No. 201611245646.1, entitled "METHOD AND APPARATUS FOR DYNAMICALLY ADJUSTING RESOURCE COMPETITION PARAMETER THRESHOLD IN RESOURCE COMPETITION" filed with the Chinese Patent Office on Dec. 29, 2016. The entire disclosures of the prior applications are hereby incorporated by reference in their entirety.

FIELD OF THE TECHNOLOGY

The present disclosure relates to the field of computer technologies, and in particular, to a method, an apparatus, and a server for adjusting a resource competition threshold.

BACKGROUND OF THE DISCLOSURE

Resource competition may be implemented in many applications. In one example, in a communication application, terminals can compete for accessing channels. In another example, in an advertisement bidding application, advertisers can compete for accessing presentation resources for posting advertisements.

Specifically, resource competition participants may send different resource competition parameters according to their own needs to a system, the system may filter out a part of competitors based on a fixed threshold, and only the remaining competitors (which may be referred to as admitted competitors) are qualified to participate in resource competition.

In some examples, if the threshold is set to an excessively high value, there may be no admitted competitor or the number of admitted competitors may be less than a number of available resources. This goes against appropriate use of the resources. However, in some examples, if the threshold is set to an excessively low value, there may be no meaningful filtering of competitors.

SUMMARY

Embodiments of the present disclosure provide a method and an apparatus for obtaining a virtual resource of a virtual object in order to accurately recommend a suitable virtual resource to a user.

According to a first aspect, an embodiment of the present disclosure provides a method for dynamically adjusting a resource competition threshold in resource competition. According to one example, processing circuitry of an apparatus obtains first competition data of a presentation position, and obtains a first optimal threshold according to the first competition data, the first competition data including competition behavior data of resource competition participants participating in competition for the presentation position in a first time period. The processing circuitry of the apparatus may obtain second competition data of the presentation position for a plurality of times, and may obtain a second optimal threshold through calculation based on the second competition data, the second competition data including competition behavior data of resource competition participants participating in competition for the presentation position in a second time period. The processing circuitry of the apparatus may obtain third competition data of the presentation position when a difference value between the second optimal threshold and the first optimal threshold is greater than a difference threshold, the third competition data including competition behavior data of resource competition participants participating in competition for the presentation position in a third time period. The processing circuitry of the apparatus may further update the first optimal threshold according to the third competition data, and returns to the operation of obtaining second competition data of the presentation position for a plurality of times and obtains a second optimal threshold through calculation based on the second competition data. In some embodiments, an end moment of the second time period being a current moment, an end moment of the first time period being not the current moment, and the third time period including at least a part of the second time period.

According to a second aspect, an embodiment of the present disclosure provides a method for dynamically adjusting a resource competition threshold. According to one example, processing circuitry of an apparatus obtains first competition data of a presentation position, and obtains a first optimal threshold according to the first competition data, the first competition data including competition behavior data of resource competition participants participating in competition for the presentation position in a first time period. The processing circuitry of the apparatus may obtain second competition data of the presentation position, and may obtain a second optimal threshold through calculation based on the second competition data, the second competition data including competition behavior data of resource competition participants participating in competition for the presentation position in a second time period. The processing circuitry of the apparatus may obtain third competition data of the presentation position when a difference value between the second optimal threshold and the first optimal threshold is greater than a difference threshold, the third competition data including competition behavior data of resource competition participants participating in competition for the presentation position in a third time period. The processing circuitry of the apparatus may further update the first optimal threshold according to the third competition data. In some embodiments, an end moment of the second time period being a current moment, an end moment of the first time period being earlier than the current moment, and the third time period including at least a part of the second time period.

According to a third aspect, an embodiment of the present disclosure provides an apparatus for dynamically adjusting a resource competition threshold in resource competition. The apparatus may include a first data analysis module and a second data analysis module. The first data analysis module is configured to obtain first competition data of a presentation position, and obtain a first optimal threshold according to the obtained first competition data, where the first competition data include competition behavior data of resource competition participants participating in competition for the presentation position in a first time period. The second data analysis module is configured to obtain second competition data of the presentation position for a plurality of times, and obtain a second optimal threshold through calculation based on the second competition data, where the second competition data include competition behavior data of resource competition participants participating in competition for the presentation position in a second time period. The second data analysis module is configured to obtain third competition data of the presentation position when a difference value between the second optimal threshold and the first optimal threshold is greater than a difference threshold, where the third competition data include competition behavior data of resource competition participants participating in competition for the presentation position in a third time period. The second data analysis module is further configured to update the first optimal threshold according to the third competition data, and return to the operation of obtaining second competition data of the presentation position for a plurality of times and obtaining a second optimal threshold through calculation based on the second competition data. In some embodiments, an end moment of the second time period being a current moment, an end moment of the first time period being not the current moment, and the third time period including at least a part of the second time period.

According to a fourth aspect, an embodiment of the present disclosure provides an apparatus for dynamically adjusting a resource competition parameter threshold. The apparatus may include a first data analysis module and a second data analysis module. The first data analysis module is configured to obtain first competition data of a presentation position, and obtain a first optimal threshold according to the first competition data, where the first competition data include competition behavior data of resource competition participants participating in competition for the presentation position in a first time period. The second data analysis module is configured to obtain second competition data of the presentation position, and obtain a second optimal threshold through calculation based on the second competition data, where the second competition data include competition behavior data of resource competition participants participating in competition for the presentation position in a second time period. The second data analysis module is configured to obtain third competition data of the presentation position when a difference value between the second optimal threshold and the first optimal threshold is greater than a difference threshold, where the third competition data include competition behavior data of resource competition participants participating in competition for the presentation position in a third time period. The second data analysis module is further configured to update the first optimal threshold according to the third competition data. In some embodiments, an end moment of the second time period being a current moment, an end moment of the first time period being earlier than the current moment, and the third time period including at least a part of the second time period.

According to a fifth aspect, an embodiment of the present disclosure provides a computer readable storage medium, the computer readable storage medium storing an instruction, and the instruction, when run on a computer, causing the computer to perform the method according to at least one or more of the foregoing aspects.

According to a sixth aspect, an embodiment of the present disclosure provides a computer program product including an instruction, and when the computer program product including an instruction runs on a computer, the computer is caused to perform the method according to the at least one or more of foregoing aspects.

According to a seventh aspect, an embodiment of the present disclosure further provides a server, and the server includes a processor and a memory. The memory can be configured to store an instruction, and the processor can be configured to execute the instruction in the memory, to cause the server to perform the method according to one or more of the foregoing aspects.

In an adjustment solution provided by the embodiments of the present disclosure, first competition data of the presentation resource is used for obtaining a first optimal threshold, from which a resource competition threshold can be set accordingly. In addition, second competition data of the presentation resource is obtained in iterations, and a second optimal threshold for each iteration can obtained according to the corresponding second competition data. Moreover, the third competition data of the presentation resource is used for obtaining an updated resource competition threshold when the difference between the second optimal threshold and the currently set resource competition threshold is excessively large. In this way, the resource competition threshold may be ensured to be adaptively adjusted for real-time situations, so that optimization of the resource competition threshold is implemented.

Aspects of the disclosure provide a method of adjusting a resource competition threshold for qualifying resource competition participants in resource competition. For example, processing circuitry of an apparatus obtains first competition data associated with first competition for a first resource that is usable during a first time period, obtains a first optimal threshold according to the first competition data, and set the resource competition threshold according to the first optimal threshold. The first competition data include competition behavior data of first resource competition participants participating in the first competition for the first resource. The processing circuitry of the apparatus obtains second competition data associated with second competition for a second resource that is usable during a second time period, and obtains a second optimal threshold according to the second competition data. The second competition is conducted according to the set resource competition threshold, and the second competition data include competition behavior data of second resource competition participants participating in the second competition for the second resource. When a difference between the second optimal threshold and the resource competition threshold is greater than a difference threshold, the processing circuitry of the apparatus obtains third competition data associated with third competition for a third resource that is usable during a third time period. The third competition is conducted according to the set resource competition threshold, and the third competition data include competition behavior data of third resource competition participants participating in the third competition for the third resource. The processing circuitry of an apparatus further updates the resource competition threshold according to the third competition data, the updated resource competition threshold being applicable to next resource competition for a next resource that is usable during a next time period. An end moment of the first time period is earlier than an end moment of the second time period, and the third time period at least partially overlaps the second time period.

Aspects of the disclosure provide an apparatus for adjusting a resource competition threshold for qualifying resource competition participants. The apparatus includes processing circuitry configured to obtain first competition data associated with first competition for a first resource that is usable during a first time period, and obtain a first optimal threshold according to the first competition data, and set the resource competition threshold according to the first optimal threshold, the first competition data including competition behavior data of first resource competition participants participating in the first competition for the first resource. The processing circuitry is configured to obtain second competition data associated with second competition for a second resource that is usable during a second time period, and obtain a second optimal threshold according to the second competition data, the second competition being conducted according to the set resource competition threshold, and the second competition data including competition behavior data of second resource competition participants participating in the second competition for the second resource. The processing circuitry is further configured to, when a difference between the second optimal threshold and the resource competition threshold is greater than a difference threshold, obtain third competition data associated with third competition for a third resource that is usable during a third time period, and update the resource competition parameter threshold according to the third competition data, the updated resource competition threshold being applicable to next resource competition for a next resource that is usable during a next time period. The third competition is conducted according to the set resource competition threshold, and the third competition data include competition behavior data of third resource competition participants participating in the third competition for the third resource. Also, an end moment of the first time period is earlier than an end moment of the second time period, and the third time period at least partially overlaps the second time period.

Aspects of the disclosure provide a non-transitory computer-readable storage medium storing computer-readable instructions, which when executed by a processor, cause the processor to perform at least the following operations for adjusting a resource competition threshold for qualifying resource competition participants in resource competition. For example, first competition data associated with first competition for a first resource that is usable during a first time period is obtained, a first optimal threshold is obtained according to the first competition data, and the resource competition threshold is set according to the first optimal threshold. The first competition data include competition behavior data of first resource competition participants participating in the first competition for the first resource. Also, second competition data associated with second competition for a second resource that is usable during a second time period is obtained, and a second optimal threshold is obtained according to the second competition data. The second competition is conducted according to the set resource competition threshold, and the second competition data include competition behavior data of second resource competition participants participating in the second competition for the second resource. When a difference between the second optimal threshold and the resource competition threshold is greater than a difference threshold, third competition data associated with third competition for a third resource that is usable during a third time period is obtained, and the resource competition threshold is updated according to the third competition data. The updated resource competition threshold is applicable to next resource competition for a next resource that is usable during a next time period. The third competition is conducted according to the set resource competition threshold, and the third competition data include competition behavior data of third resource competition participants participating in the third competition for the third resource. Also, an end moment of the first time period is earlier than an end moment of the second time period, and the third time period at least partially overlaps the second time period.

DESCRIPTION OF EMBODIMENTS

Embodiments of the present invention provide a method and an apparatus for dynamically adjusting a resource competition parameter threshold, and a server, to dynamically and adaptively adjust the resource competition parameter threshold.

In some embodiments, according to the present disclosure, a resource competition threshold can be adjusted in order to optimize the process for qualifying resource competition participants in resource competition.

Figure 1:
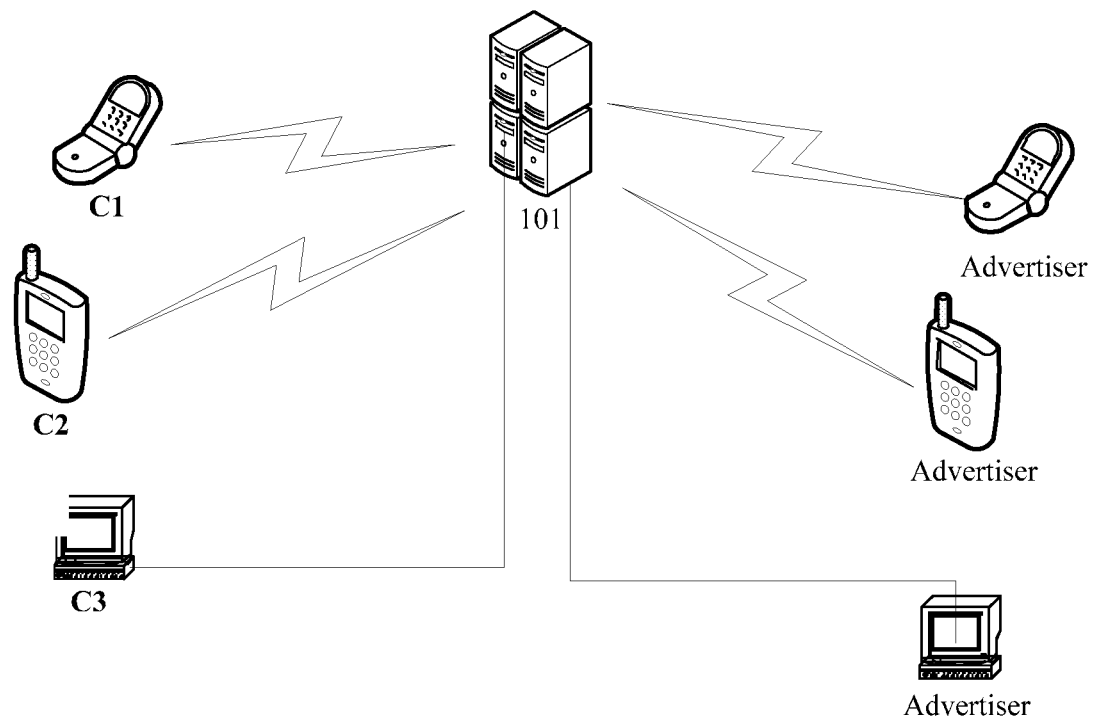
FIG. 1 is a schematic diagram showing an exemplary application of a resource competition threshold adjustment apparatus according to at least one embodiment.

FIG. 1 is a schematic diagram showing an exemplary application of a resource competition threshold adjustment apparatus according to at least one embodiment. The application as shown in FIG. 1 includes a server 101 (including the adjustment apparatus), terminal devices C1, C2, and C3, and three advertisers as resource competition participants.

The adjustment apparatus may be implemented in the server 101 in a software or hardware manner.

The terminal devices C1, C2, C3, and the like may be devices that are equipped with communication functionality, such as various handheld devices, in-vehicle devices, wearable devices, computing devices, positioning devices, or any other processing devices connected to a wireless modem, or various user equipments (UEs), mobile stations (MSs), mobile phones, tablet computers, desktop computers, personal digital assistants (PDAs), and the like. It should be noted that FIG. 1 displays three terminal devices as an example. In some examples, the number of terminal devices is not limited to three and may be less or more.

A client application may be deployed on each of the foregoing terminal devices, for example, a social application client or a news client. Also, in this disclosure, a use of the client application or an audience of an advertisement may also refer to a terminal device that is operated by the user or the audience as a recipient of a piece of advertisement data.

In an advertisement posting application, when logging in to a client application or browsing a client web page or even clicking a link, an ordinary public user or an audience to which an advertisement is pushed can send an information obtaining request (for example, an advertisement pulling request) to the server 101, to request the server 101 to push a media file (for example, an advertisement) to the ordinary public user or the audience. The media file includes but is not limited to a video file, an audio file, an image file, a text file, or the like, or any combination thereof.

In an news client example, at any given moment, there may be tens of thousands of ordinary public users opening or browsing the news client, and advertisement content provided to different users can be different according to different hobbies of the users, and the like. Presentation resources for displaying advertisements, such as advertisement positions of all opened clients at a particular moment are bid by a plurality of advertisers (which may alternatively be referred to as resource competition participants). Only an advertisement of a winning advertiser can be presented.

A reserve price is similar to a lowest acceptable price, or a price threshold, and the principle of the bidding can be described by using the following simplified example. Assuming that the reserve price is 3 yuan (RMB, ¥), and bids of an advertiser 1, an advertiser 2, an advertiser 3, and an advertiser 4 that participate in competition for a particular presentation resource (for example, an advertisement position 1 of a first user A at a T0 moment) are respectively 1 yuan, 2 yuan, 3 yuan, and 4 yuan, the advertisers 1 and 2 are not qualified for bidding lower than the reserve price, and thus are eliminated from participating in the competition for the particular presentation resource. The advertisers 3 and 4 are allowed to participate in competition for the particular presentation resource based on the bidding prices as well as other factors. Assuming that the advertiser 4 finally wins, an advertisement of the advertiser 4 is presented using the particular presentation resource (i.e., the advertisement position 1 of the first user A at the T0 moment).

In one example, for a user A of a social networking application (e.g., WeChat Moments), there is generally one advertisement position, and the server 101 posts an advertisement of a winning advertiser to the advertisement position of the WeChat client of the user A. For an exemplary news client application, with an increase of the quantity of news browsed by a user B, a plurality of advertisement positions may be used for presenting advertisements. In this case, a plurality of advertisers participates in bidding competition for each advertisement position, and each advertisement posted on each advertisement position is an advertisement of a winning advertiser.

The server 101 or the adjustment apparatus may be an advertisement server, or a server cluster/cloud platform formed by a plurality of advertisement servers.

Figure 2:
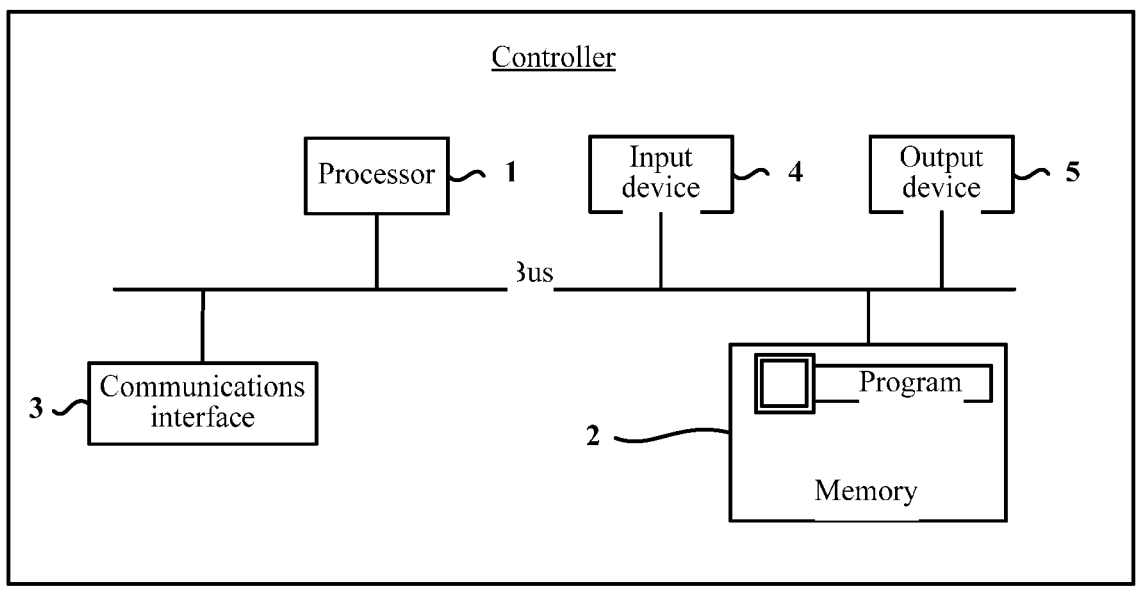
FIG. 2 is an exemplary structural diagram of an adjustment apparatus or a server according to an embodiment.

FIG. 2 is an exemplary structural diagram of the adjustment apparatus or the server 101. As shown in FIG. 2, the adjustment apparatus includes a bus, a processor 1, a memory 2, a communications interface 3, an input device 4, and an output device 5. The processor 1, the memory 2, the communications interface 3, the input device 4, and the output device 5 are connected to each other by using the bus.

In some embodiments, the bus may include a path for transferring information between components of a computer system.

In some embodiments, the processor 1 may be a general purpose processor such as a general central processing unit (CPU), a network processor (NP), or a microprocessor, or one or more integrated circuits configured to control execution of a program for implementing various embodiments described in this disclosure. In some other examples, the processor 1 may be a digital signal processor (DSP), an application-specific integrated circuit (ASIC), a field programmable gate array (FPGA), or another programmable logic device, discrete gate, or a transistor logic device, or a discrete hardware component.

In some embodiments, the memory 2 stores a program for implementing various embodiments described in this disclosure, and may further store an operating system and other instruction sets for rendering one or more services. Specifically, the program may include program code, and the program code includes a set of computer operation instructions. More specifically, the memory 2 may include a read-only memory (ROM), another type of static storage device that may store static information and an instruction, a random access memory (RAM), another type of dynamic storage device, magnetic disk storage and flash that may store information and an instruction, or the like.

In some embodiments, the communications interface 3 may include an apparatus using any transceiver or the like to communicate with another device or a communications network such as an Ethernet, a radio access network (RAN), or a wireless local area network (WLAN).

In some embodiments, the input device 4 may include an apparatus for receiving data and information input by a user. For example, the input device 4 may include a keyboard, a mouse, a camera, a scanner, a light pen, a voice input device, a touchscreen, a pedometer, or a gravity sensor.

In some embodiments, the output device 5 may include an apparatus allowed to output information to a user. For example, the output device 5 may include a display screen, or a speaker.

In some embodiments, the method for dynamically adjusting a resource competition threshold according to various embodiments described in this disclosure can be implemented by the processor 1 of the adjustment apparatus or the server 101 that executes the program stored in the memory 2 and/or in conjunction with another device.

A detailed description is further provided below based on a common aspect in the foregoing embodiments of the present disclosure.

Figure 3:
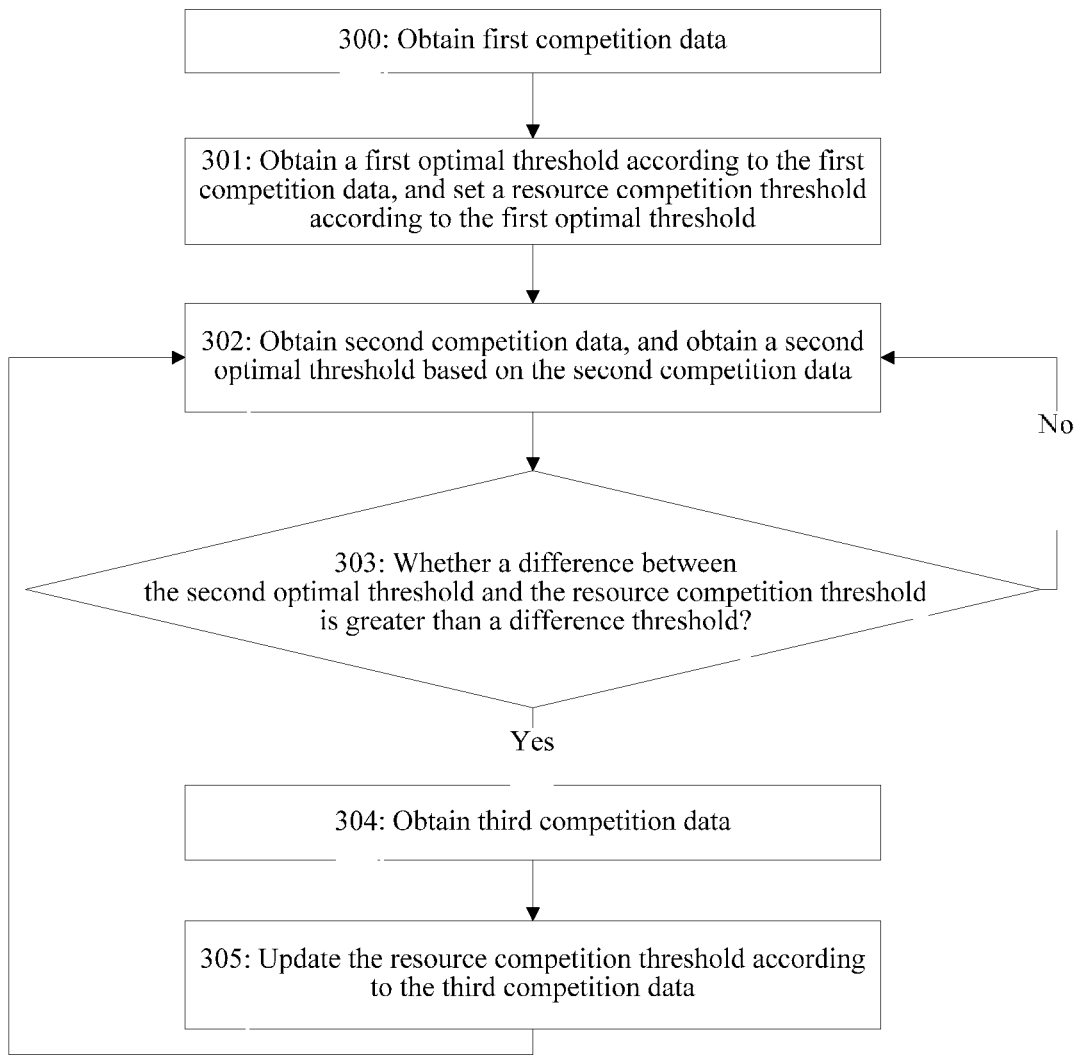
FIG. 3 is an exemplary flowchart of an adjustment method according to an embodiment.

FIG. 3 is an exemplary interactive schematic diagram of a method for dynamically adjusting a resource competition parameter threshold according to an embodiment. The method is implemented through interaction between the processor 1 of the server 101 or adjustment apparatus and another internal or external device.

The exemplary procedure shown in FIG. 3 includes:

Step 300: The processor 1 obtains first competition data. The first competition data is associated with first competition for a first resource that is usable during a first time period.

In an advertisement bidding application scenario, the first resource may be a presentation position, such as an advertisement position.

The first competition data may include competition behavior data of resource competition participants participating in competition for the first resource that is usable during the first time period. In other words, the first competition data represents competition behaviors of the resource competition participants for the presentation position in the first time period.

A length and a start/end moment of the first time period can be flexibly designed according to situations. For example, the time period length can be one hour, one day, one week, or two weeks. For example, the time period length is one hour, and competition data obtained at 13:00 is competition data between 12:00-13:00.

Optionally, the presentation position is associated with a plurality of presentation resources in one time period. Therefore, the aforementioned "competition behavior data of resource competition participants participating in competition for the presentation position" may further include competition behavior data of resource competition participants participating in competition for each presentation resource.

The competition behavior data of each resource competition participant may include: a user identifier of the resource competition participant and a media file identifier and a resource competition parameter associated with the user identifier. It should be noted that one user identifier of one resource competition participant may be associated with one or more media file identifiers.

In some embodiments, the presentation resource may include: an audience identification identifier (for example, a user identification identifier of a news client), a presentation position identifier (for example, an advertisement position identifier of a news client), and a presentation moment, for example, a moment at which an advertisement is presented to an audience corresponding to the identification identifier at a position of the advertisement position identifier of the news client.

In some embodiments, there may be tens of thousands of audiences opening or browsing the news client, and advertisement content seen by different audiences is different due to different hobbies and the like. Each advertisement position of each opened client at each moment is bid by a plurality of advertisers. Only an advertisement of a winning advertiser can be presented.

Using a news client as an example, assuming that first competition data between 12:00-13:00 is obtained, the first competition data may exemplarily include the following content: a presentation resource 1 (an advertisement position 1 presented to an audience A at the moment 12:00), identifiers of a plurality of resource competition participants (advertisers) participating in competition, a media file identifier (advertisement), and advertisement bids (resource competition parameters) that correspond to the presentation resource 1; and a presentation resource 2 (an advertisement position 1 presented to an audience B at the moment 12:00), identifiers of a plurality of resource competition participants (advertisers) participating in competition, a media file (advertisement), and advertisement bids that correspond to the presentation resource 2.

For example, in an advertisement bidding application scenario, a resource competition participant is an advertiser, a media file associated with the resource competition participant is an advertisement file that the advertiser expects to post, and a resource competition parameter is a bid of the advertiser.

For example, it is assumed that for a first advertisement position for an audience Lily of a news client, at a T0 moment, an advertiser M1 expects to post a vehicle advertisement (which has an identifier P1) to Lily, and a bid is 1 yuan; an advertiser M2 expects to post a cosmetic advertisement (which has an identifier P2) to Lily, and a bid is 0.5 yuan; and an advertiser M3 expects to post a leather shoe advertisement (which has an identifier P3) to Lily, and a bid is 0.1 yuan. Also, it is assumed that for a first advertisement position for an audience Lucy of the news client, at a T0 moment, an advertiser M4 expects to post a dietary supplement advertisement (which has an identifier P4) to Lucy, and a bid is 0.5 yuan; and an advertiser M5 expects to post an electronic product advertisement (which has an identifier P5) to Lucy, and a bid is 0.5 yuan.

In this exemplary case, a correspondence between competition behavior data and the presentation resource may exemplarily include content shown in the following table:

| Presentation resource | | | Competition behavior data | | |
|---|---|---|---|---|---|
| Advertisement position identifier | User identifier of audience | Moment | User identifier of advertiser | Advertisement identifier | Bid |
| 1 | Lily | T0 | M1 | P1 | 1 |
| 1 | Lily | T0 | M2 | P2 | 0.5 |
| 1 | Lily | T0 | M3 | P3 | 0.1 |
| 1 | Lucy | T0 | M4 | P4 | 0.5 |
| 1 | Lucy | T0 | M5 | P5 | 0.5 |

As there may be massive presentation resources at each moment, to reduce a processing load, a presentation resource and competition behavior data corresponding to the presentation resource can be obtained through data extraction by sampling.

Specifically, a particular sampling frequency may be used for the data extraction. For example, if duration of the first time period is one day, the data extraction can be performed once every one hour on this day.

In an advertisement bidding application scenario, the resource competition threshold may include a reserve price that can be set by the system, and the reserve price is not publicized to any advertiser. An automatic bidding system can be used by the advertisers to automatically send bids to the server 101 for bidding. Certainly, an advertiser needs to set, in advance, a bid for presenting an advertisement each time.

Information such as the bid is stored by using a log. Therefore, in an exemplary description, the processor 1 can obtain first competition data by extracting information from the log.

Step 301: The processor 1 obtains a first optimal threshold according to the first competition data. Also, the processor 1 can set a resource competition threshold for the server 101 according to the first optimal threshold.

In an advertisement bidding application scenario, the first optimal threshold may include a first optimal reserve price, that is, an initially determined optimal reserve price. Different advertisement positions may correspond to different first optimal reserve prices.

Before the resource competition threshold is further updated, the resource competition threshold set according to the first optimal reserve price obtained at this time is continued to be used for filtering the resource competition participants participating in real-time competition for the presentation resource.

For example, it is assumed that the resource competition threshold is set to an optimal reserve price obtained at the moment 13:00 is 0.2 yuan, the resource competition threshold is updated to 0.1 yuan at 15:00, and the resource competition threshold is further updated to 0.3 yuan at 21:00.

In this case, between 13:00 and 15:00, 0.2 yuan is used for filtering out advertisers whose bids are less than 0.2 yuan; between 15:00 and 21:00, 0.1 yuan is used for filtering out advertisers whose bids are less than 0.1 yuan; and after 21:00, 0.3 yuan is used for filtering out advertisers whose bids are less than 0.3 yuan.

In an example, the following manner may be used for obtaining the first optimal threshold: performing presentation resource competition simulation based on the first competition data, calculating competition benefit values corresponding to the presentation position for different resource competition thresholds, and then determining, in the different resource competition thresholds, the first optimal threshold corresponding to the largest competition benefit value. In subsequent embodiments of the present invention, more detailed descriptions are further provided.

Step 302: The processor 1 obtains second competition data, and obtains a second optimal threshold based on the second competition data. The Step 302 can be performed repetitively and/or periodically for determining whether to update the resource competition threshold according to latest competition data during various iterations.

The second competition data may include competition behavior data of resource competition participants participating in competition for the presentation position in a second time period. In other words, the second competition data represents competition behaviors of the resource competition participants for the presentation position in the second time period. For other related content, refer to the description in the foregoing Step 300. Details are not described herein.

It should be noted that an end moment of the second time period can be a current moment. The current moment is a moment at which the second competition data is obtained.

An end moment of the first time period is not the current moment. For example, the end moment of the first time period is earlier than the end moment of the second time period. Assuming that the current moment is 13:00, the end moment of the first time period is earlier than 13:00.

In an example, the second competition data can be obtained at a fixed time interval in the second time period. A person skilled in the art may flexibly design the time interval. For example, the time interval may be designed as one second or several seconds, and the second competition data is obtained once every one or several seconds. For another example, the time interval may be designed as one minute, one hour, or the like.

In some other embodiments, the second competition data may be randomly obtained for a plurality of times in the second time period, and the second optimal threshold may be obtained through calculation.

In addition, a person skilled in the art may also flexibly design duration of the second time period, for example, may design duration of the second time period as one second, several seconds, one minute, one hour, or the like.

In some embodiments, the duration of the second time period may be less than the duration of the first time period.

In some embodiments, the calculation manner of the second optimal threshold may be different from the determining manner of the first optimal threshold.

In an example, probability distribution and a probability density of a quality factor corresponding to the resource competition participants may be calculated according to the second competition data, and the second optimal threshold may be calculated according to the probability distribution and the probability density of the quality factor. In this disclosure, how to calculate the second optimal threshold according to the probability distribution and the probability density of the quality factor is further described below in detail.

In some embodiments, the quality factor is a comprehensive value. For example, based on an actual situation, an advertisement of an advertiser whose bid is high generally has a better quality and has a relatively high probability of attracting a user to click it. It should be noted that a relationship between the bid and the quality factor is not linear, and the quality factor may be a factor obtained by fitting bids of different advertisers. More specifically, in an advertisement bidding application scenario, the second optimal threshold may include a second optimal reserve price, and the probability distribution and the probability density of the quality factor may be obtained by bids of advertisers.

For example, it is obtained through statistics that in the second competition data, the number of advertisers whose bids are 4 yuan is A, the number of advertisers whose bids are 3 yuan is B, and the number of advertisers whose bids are 5 yuan is C. Based on the aforementioned statistics result, a probability distribution function and a probability density function of the advertisers having different bids are obtained and are used as the probability distribution and the probability density of the quality factor.

Step 303: The processor 1 determines whether a difference between the second optimal threshold obtained through calculation and the set resource competition threshold is greater than a difference threshold. If yes, the process proceeds to Step 304; otherwise, if no, the process returns to Step 302 for a next iteration using the currently set resource competition threshold.

The difference value may be calculated in a plurality of manners. For example, assuming that the second optimal threshold is presented by Y1, and the set resource competition threshold is presented by Y2, |Y2−Y1| can be used as the difference value.

Alternatively, a formula $$\left|\frac{Y1}{Y2} - 1\right|$$

is used for calculating the difference value.

The difference threshold can be flexibly designed according to different actual scenarios. Details are not described herein.

Step 304: Obtain third competition data.

The third competition data may include competition behavior data of resource competition participants participating in competition for the presentation position in a third time period. In other words, the third competition data represents competition behaviors of the resource competition participants for the presentation position in the third time period.

An end moment of the third time period may be a moment at which the third competition data is obtained.

It should be noted that the third time period includes at least a part of the second time period. Assuming that a moment of obtaining the second competition data is 13:00, and duration of the third time period is 30 minutes. In this case, the third time period may be 12:30 to 13:00, or 13:00 to 13:30, or 12:50 to 13:20, or the like.

A person skilled in the art may also flexibly design the duration of the third time period, for example, may design the duration of the third time period as one second, several seconds, one minute, one hour, one day, or the like.

Step 305: Update the resource competition threshold according to the third competition data.

In some other embodiments of, after performing Step 305 of updating the set resource competition threshold according to the third competition data, the process can return to Step 302 for a next iteration using the updated resource competition threshold.

In an example, the updated resource competition threshold can be obtained through re-calculation according to the third competition data. That is, Step 305 is performed in a manner similar to Step 301.

For ease of understanding this solution, a non-limiting simplified example is provided. In this example, it is assumed that the duration of the first time period is one hour, and the duration of the third time period is two hours. At the moment 13:00, competition data (first competition data) between 12:00 and 13:00 is obtained, so that a first optimal reserve price is obtained. The first optimal reserve price is used in subsequent advertisement bidding as the set resource competition threshold. In addition, the second competition data is obtained for a plurality of times, to be used for calculating a second optimal reserve price.

Assuming that at a moment 17:00, it is found that a difference value between the second optimal reserve price and a currently set resource competition threshold is greater than a difference threshold, the current moment (17:00) is used as an end moment, and competition data in two hours before 17:00 is obtained, that is, competition data (that is, third competition data) between 15:00 and 17:00. Based on the third competition data, an updated optimal reserve price is calculated, and then is used as the updated resource competition threshold in subsequent advertisement bidding. In this way, the checking and updating the resource competition threshold can be performed through repeated iterations.

The reason of the iterations is that behaviors of advertisers are dynamically changed. As such, when the number of advertisers participating in competition increases or decreases, or a bid of an advertiser is changed, the initially set resource competition threshold according to the first optimal threshold needs to be corrected accordingly.

It should be noted that the method for dynamically adjusting a resource competition threshold provided in the embodiments of the present disclosure is for each advertisement position. In some applications, the advertisement position is different from the presentation resource, where the presentation resource may further include an audience ID and a presentation moment. Therefore, for each advertisement position, first competition data in a first time period is obtained, and a first optimal threshold corresponding to the advertisement position is obtained according to the first competition data. Then, second competition data of the advertisement position is obtained through repeated iterations, a corresponding second optimal threshold is calculated according to the second competition data for each iteration. When a difference between the second optimal threshold and the currently set resource competition threshold corresponding to the advertisement position is excessively large, third competition data can be obtained. The resource competition threshold corresponding to the advertisement position can be updated according to the third competition data.

It can be learned that, in the adjustment solution provided by the embodiments of the present disclosure, the first competition data of the presentation resource is used for obtaining the first optimal threshold. The second competition data of the presentation resource is obtained for a plurality of times, and the corresponding second optimal threshold is obtained according to the second competition data. Further, the third competition data of the presentation resource is used for obtaining the updated resource competition threshold when the difference between the second optimal threshold and the currently set resource competition threshold is excessively large. In this way, the resource competition threshold may be ensured to be adaptively adjusted for real-time situations, so that optimization of the resource competition threshold is implemented.

The following provides a detailed description of technical solutions of the present disclosure by using advertisement bidding as an application scenario. The method described in this disclosure can be modified to be used in other types of resource competition applications.

Figure 4A:
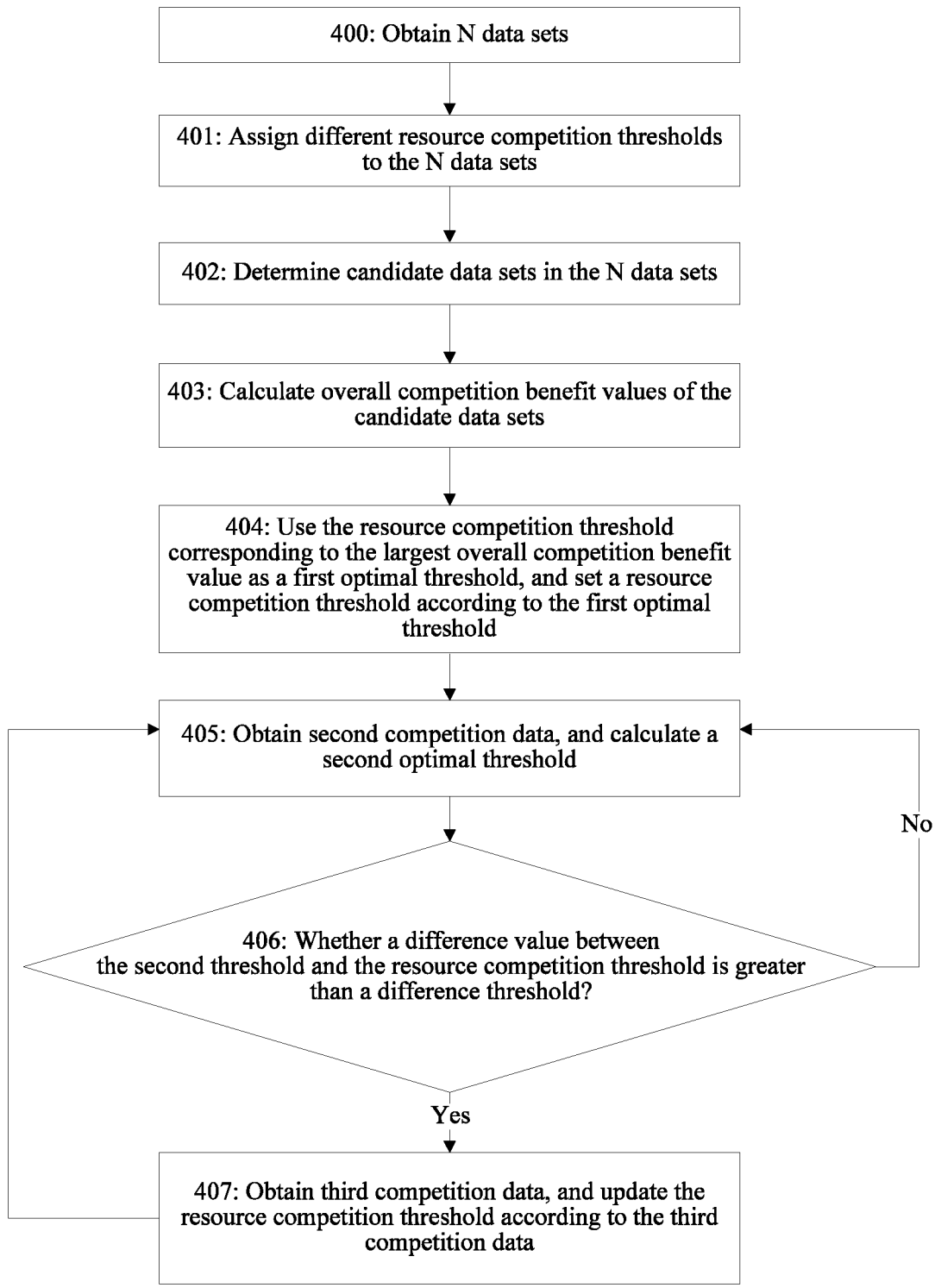
FIG. 4a is another exemplary flowchart of an adjustment method according to an embodiment.
Figure 4B:
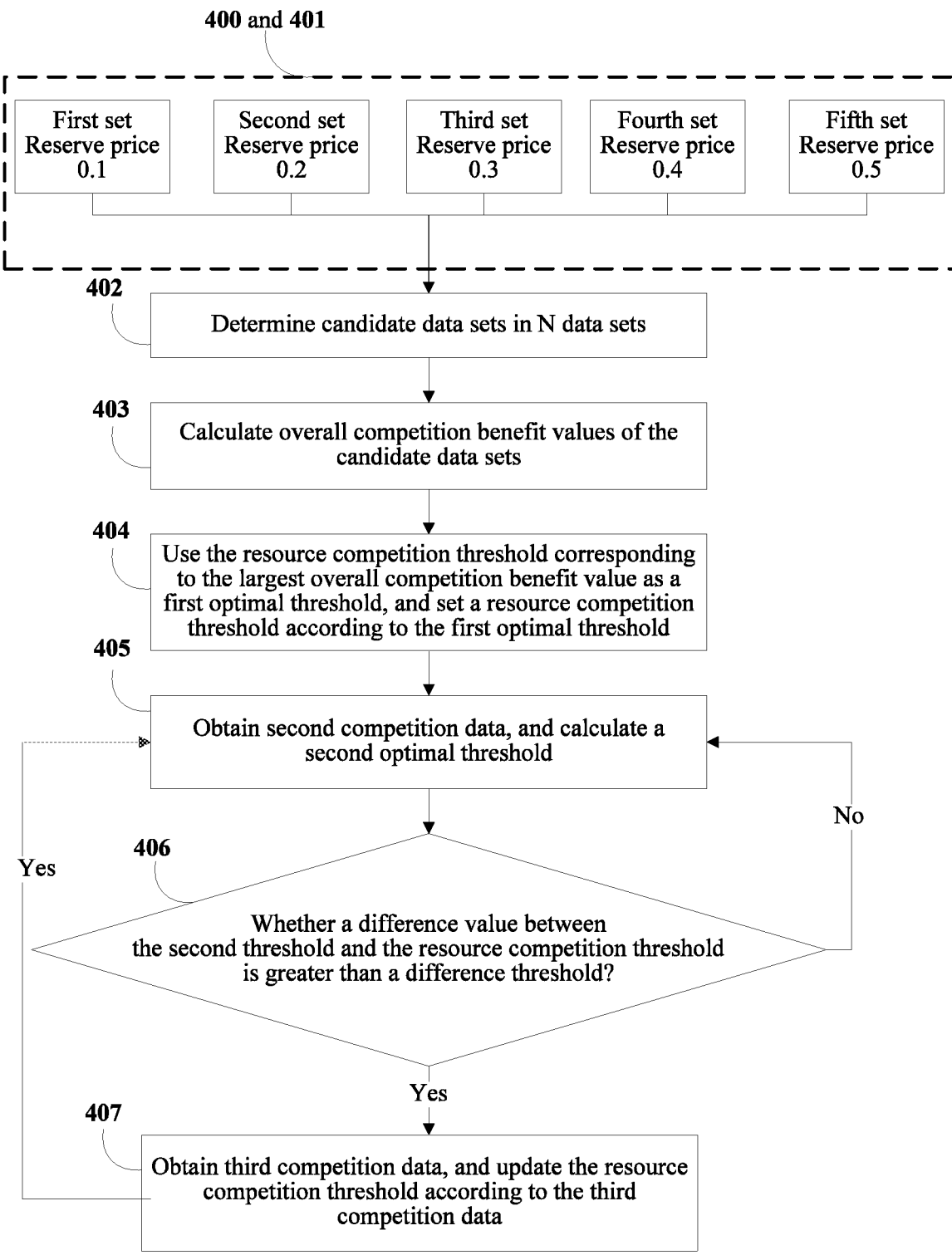
FIG. 4b is another exemplary flowchart of an adjustment method according to an embodiment.

Referring to FIG. 4a and FIG. 4b, each of FIG. 4a and FIG. 4b is a flowchart of exemplary adjustment method according to one or more embodiments. In some embodiments, the method as illustrated with reference to FIG. 4a or FIG. 4b is implemented through interaction between the processor 1 of the server 101 or adjustment apparatus and another device.

In these embodiments shown in FIG. 4a and FIG. 4b, an advertisement position A is used as an example for description. The advertisement position in some examples may include various presentation resources that are usable at different time periods may be referred to as resources subject to competition.

In some embodiments, the aforementioned interaction procedure includes at least the following parts.

Step 400: The processor 1 obtains first competition data of the advertisement position A.

For a related description of the first competition data, refer to the description in the Step 300 described above. Details are not described herein.

The first competition data is divided into N data sets, N being a positive integer greater than 1.

For example, referring to FIG. 4b, the first competition data can be divided into five data sets.

Each data set may include a plurality of presentation resources, and competition behavior data of resource competition participants participating in competition for each presentation resource. For specific details, refer to Step 300 described above.

Step 401: The processor 1 assigns different resource competition thresholds (reserve prices) to the N data sets.

For example, referring to FIG. 4b, the processor 1 assigns five reserve prices to the five data sets, and the five reserve prices are respectively 0.1, 0.2, 0.3, 0.4, and 0.5.

Step 402: The processor 1 determines candidate data sets in the N data sets.

The resource competition thresholds corresponding to the candidate data sets include a target resource competition threshold.

In an example, the following manner may be used for determining whether an $i^{th}$ data set is a candidate data set, i being a positive integer ranging from 1 to N.

Step A: Based on an $i^{th}$ resource competition parameter threshold, calculate benefit influence related data of the $i^{th}$ data set.

In some embodiments, the benefit influence related data may include a predicted CTR (click-through rate), the number of influenced advertisers (advertisers that are filtered out), the number of influenced advertisements, and the like.

It should be noted that different reserve prices may influence the CTR, the number of advertisers and the number of advertisements that are influenced, and the like.

For example, it is assumed that, in 50 advertisers, there are three advertisers whose bids are greater than 0.5, five advertisers whose bids are greater than 0.4 but less than 0.5, six advertisers whose bids are greater than 0.3 but less than 0.4, seventeen advertisers whose bids are greater than 0.2 but less than 0.3, ten advertisers whose bids are greater than 0.1 but less than 0.2, and 9 advertisers whose bids are less than 0.1. If the reserve price is 0.1, the number of influenced advertisers is nine, but if the reserve price is 0.2, the number of influenced advertisers is nineteen.

In addition, a higher reserve price indicates a larger number of advertisers and advertisements that are filtered out or disqualified. In this case, the type or style of the presented advertisements is relatively undiversified. As a result, the CTR of audiences may be negatively impacted.

Step B: Determine whether the benefit influence related data satisfies a constraint condition.

In some examples, the constraint condition may be set in association with the smallest threshold of CTR, the largest threshold of the number of influenced advertisers, and/or the largest threshold of the number of influenced advertisements. In some embodiments, if a predicted CTR is greater than the smallest threshold of CTR, a predicted number of influenced advertisers is less than the largest threshold of the number of influenced advertisers, and a predicted number of influenced advertisements is less than the largest threshold of the number of influenced advertisements, the constraint condition is considered to be satisfied.

Step C: Use the $i^{th}$ data set as the candidate data set if it is determined that the benefit influence related data satisfies the aforementioned constraint condition.

In some embodiments, for those data sets that fail to satisfy satisfying the constraint condition, operations corresponding to Step 403 and/or subsequent operations may not be performed.

Step 403: The processor 1 calculates, based on each resource competition threshold corresponding to each candidate data set, an overall competition benefit value of the candidate data set.

In an example, a competition benefit value corresponding to each presentation resource may be calculated based on a target resource competition threshold corresponding to the candidate data set, and then a summation operation is performed on competition benefit values corresponding to all the presentation resources, to obtain the overall competition benefit value of the candidate data set.

For example, assuming that a candidate data set has 100 presentation resources, an expected benefit value of each of the 100 presentation resources may be calculated, and then a summation operation is performed, so that an overall competition benefit value of the whole set can be obtained.

More specifically, in some embodiments, the calculating a competition benefit value corresponding to one of the presentation resources may include at least the steps illustrated below.

Step A1: Filter competition behavior data of resource competition participants competing for any one of the presentation resources, to obtain a competition behavior data subset.

The resource competition thresholds corresponding to the candidate data sets include a target resource competition threshold; and the competition behavior data subset includes competition behavior data of resource competition participants whose resource competition parameter (e.g., bids placed by the resource competition participants) is greater than or equal to the target resource competition threshold.

For example, assuming that a data set 2 is the candidate data set and a reserve price assigned thereto is 0.2, in this set, there are 50 advertisers competing for a presentation resource 1, and bids of 10 advertisers are less than 0.2. The ten advertisers whose bids are less than 0.2 are filtered out. Competition behavior data of the remaining 40 advertisers constitutes a competition behavior data subset.

Step B1: Calculate an effective cost per mille (ecpm) for each media file (advertisement) in the competition behavior data subset.

Step C1: Calculate an expected benefit value for the media file having the greatest ecpm (which can also be referred to as a benefit value), and use the calculated expected benefit value as the competition benefit value corresponding to any one of the presentation resources.

In an example, advertisements in the competition behavior data subset may be sorted in descending order of the ecpm. In some embodiments based on the settings as described in the example discussed above with regard to calculating the competition benefit value, assuming that the competition behavior data subset includes competition behavior data of 40 advertisers that have 50 advertisements in total, ecpm of each of the 50 advertisements is calculated, and the advertisements are sorted in descending order of the ecpm.

In some embodiments, assuming that a particular advertisement among the 50 advertisements, such as an advertisement indexed number 4, is the first in line, an expected benefit value of the number 4 advertisement is calculated as a competition benefit value of the presentation resource 1.

It should be noted that for different charge modes, there may be different calculation logic for calculating an expected benefit, so that different expected benefit values are obtained.

For example, when a generalized second price (GSP) mode is used, the following calculation logic may be used for calculating an expected benefit value in this mode.

(1) In the GSP mode, if a bid of an advertisement that is the first in line is greater than a reserve price, and a charged fee of the advertisement that is the first in line is also greater than the reserve price, the expected benefit value is calculated according to the charged fee.

A calculation manner of the charged fee is: a bid of an advertisement that is the second in line plus a fixed value (such as 0.1).

For example, for the presentation resource 1, an advertisement that is the first in line has a bid of 1 yuan and a charged fee of 0.8 yuan, and an assigned reserve price is 0.2 yuan, so that the expected benefit value is calculated according to 0.8.

(2) If the bid of the advertisement that is the first in line is greater than the reserve price, but the charged fee of the advertisement that is the first in line is less than the reserve price, a fee is charged in accordance with the reserve price, so that the expected benefit value is calculated.

For example, for the presentation resource 1, the advertisement that is the first in line has a bid of 1 yuan and a charged fee estimation is 0.18 yuan, and an assigned reserve price is 0.2 yuan, the assigned reserve price can be used as the actual charged fee, so that the expected benefit value is calculated according to 0.2, the reserve price.

Step 404: The processor 1 uses the resource competition threshold corresponding to the largest overall competition benefit value as a first optimal threshold. Also, the processor 1 can set a resource competition threshold for the server 101 according to the first optimal threshold.

Assuming that four candidate data sets A to D are determined in the 5 data sets, an overall competition benefit value of the candidate data set D is the largest, and a resource competition threshold corresponding to the candidate data set D is 0.4, 0.4 is used as the first optimal threshold.

In addition, in another embodiment, the overall competition benefit value of each data set may be directly calculated, and the resource competition threshold corresponding to the largest overall competition benefit value is selected to be used as the first optimal threshold.

Step 405: The processor 1 obtains second competition data, and obtains a second optimal threshold based on the second competition data.

Based on the foregoing descriptions, the second optimal threshold may be calculated according to probability distribution and a probability density of a quality factor.

More specifically, the second optimal threshold may be calculated according to the following formula:

$$p^* = \frac{S^*}{e};$$

where p* represents the second optimal threshold, S* represents a value of a quality factor S (which corresponds to the largest benefit), and e represents a CTR.

In an example, in an advertisement bidding application scenario, e is an average CTR of an advertisement position (for example, an advertisement position A) in a second time period or a current CTR of the advertisement position.

In addition, S* is a value making $$S - \frac{1 - F(S)}{f(S)}$$

equal to 0. S represents a quality factor, and F(S) and f(S) are a probability distribution function and a probability density function of the quality factor, respectively.

Of course, in some embodiments, another manner may be used for calculating the second optimal threshold. Details are not described herein.

Step 406: The processor 1 determines whether a difference value between the second optimal threshold obtained through calculation and the resource competition threshold is greater than a difference threshold, and if yes, the process proceeds to Step 407; otherwise, the process returns to Step 405 for a next iteration using the currently set resource competition threshold.

Step 406: whether a difference between the second optimal threshold n and the set resource competition threshold is greater than a difference threshold can be determined in a manner similar to Step 303.

Step 407: Obtain third competition data of the presentation position, update the currently set resource competition threshold according to the third competition data, and the process returns to Step 405 for a next iteration using the updated resource competition threshold.

For a related description of the third competition data, refer to the description in the foregoing Step 304. Details are not described herein.

In some embodiments, the updated resource competition threshold can be determined a manner similar to that in Steps 401 to 404.

Figure 5:
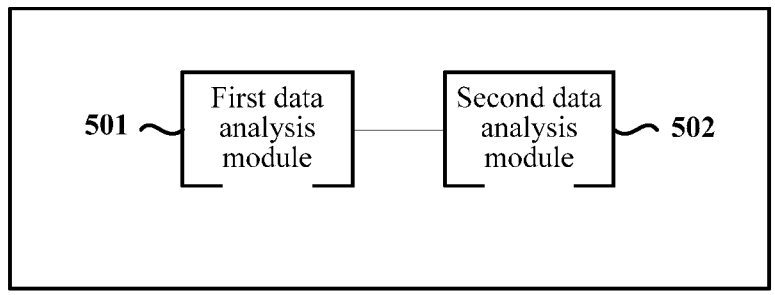
FIG. 5 is another exemplary structural diagram of an adjustment apparatus or a server according to an embodiment.

FIG. 5 is another exemplary structural diagram of an adjustment apparatus or a server according to an embodiment. As shown in FIG. 5, the adjustment apparatus includes a first data analysis module 501 and a second data analysis module 502.

In some embodiments, the first data analysis module 501 is configured to obtain first competition data of a presentation position, and obtain a first optimal threshold according to the first competition data. In some embodiments, the first competition data include competition behavior data of resource competition participants participating in competition for the presentation position in a first time period. A resource competition threshold for the server can be set according to the first optimal threshold.

In some embodiments, the second data analysis module 502 is configured to obtain second competition data of the presentation position, and obtain a second optimal threshold through calculation based on the second competition data. In some embodiments, the second competition data including competition behavior data of resource competition participants participating in competition for the presentation position in a second time period. The second data analysis module 502 can be configured to obtain third competition data of the presentation position when a difference value between the second optimal threshold and the currently set resource competition threshold is greater than a difference threshold. In some embodiments, the third competition data including competition behavior data of resource competition participants participating in competition for the presentation position in a third time period. The second data analysis module 502 can also be configured to update the resource competition parameter threshold according to the third competition data.

An end moment of the second time period can be a current moment, an end moment of the first time period can be earlier than the current moment, and the third time period can include at least a part of the second time period.

Further, after updating the resource competition threshold for the server according to the third competition data, the second data analysis module 502 may further be configured to return to the operation of obtaining second competition data of the presentation position for a plurality of times in subsequent iterations and obtaining corresponding second optimal thresholds through calculation based on the respective second competition data in iterations.

In some embodiments, in terms of obtaining a first optimal threshold according to the first competition data, the first data analysis module 501 can be configured to calculate, based on the first competition data, competition benefit values corresponding to the presentation position for different resource competition thresholds. The first data analysis module 501 can also be configured to determine, in the different resource competition thresholds, the resource competition threshold corresponding to the largest competition benefit value as the first optimal threshold.

In some embodiments, before the calculating competition benefit values corresponding to the presentation position for different resource competition thresholds, the first data analysis module 501 can be further configured to divide the first competition data into N data sets, N being a positive integer greater than 1.

In some embodiments, in terms of calculating competition benefit values corresponding to the presentation position for different resource competition thresholds based on the first competition data, the first data analysis module 501 can be configured to assign different resource competition thresholds to the N data sets, determine candidate data sets in the N data sets, and calculate, based on the resource competition threshold corresponding to each candidate data set, an overall competition benefit value of the candidate data set.

In some embodiments, the first data analysis module can be configured to set the resource competition threshold among the tested resource competition thresholds corresponding to the largest overall competition benefit value as the first optimal threshold.

In some embodiments, in terms of determining candidate data sets in the N data sets, the first data analysis module 501 can be configured to calculate, based on an $i^{th}$ resource competition threshold, benefit influence related data of the $i^{th}$ data set, i being a positive integer less than N. The first data analysis module 501 can be configured to determine whether the benefit influence related data of the $i^{th}$ data set satisfies a constraint condition, and use the $i^{th}$ data set as a candidate data set if it is determined that the benefit influence related data of the $i^{th}$ data set satisfies the constraint condition.

In some embodiments, in terms of obtaining a second optimal threshold through calculation based on the obtained second competition data, the second data analysis module 502 can be configured to calculate probability distribution and a probability density of a quality factor corresponding to resource competition participants according to the second competition data, and calculate the second optimal threshold according to the probability distribution and the probability density of the quality factor.

For specific details, refer to the foregoing descriptions in this specification. Details are not described herein.

The first data analysis module 501 may be configured to perform Steps 300 and 301 of the embodiment shown in FIG. 3. In addition, the first data analysis module 501 may further perform Steps 400 to 404 of the embodiment shown in FIG. 4*a* and FIG. 4*b*.

The second data analysis module 502 may be configured to perform Steps 302 to 305 of the embodiment shown in FIG. 3. In addition, the second data analysis module 502 may further perform Steps 405 to 407 of the embodiment shown in FIG. 4*a* and FIG. 4*b*.

Figure 6:
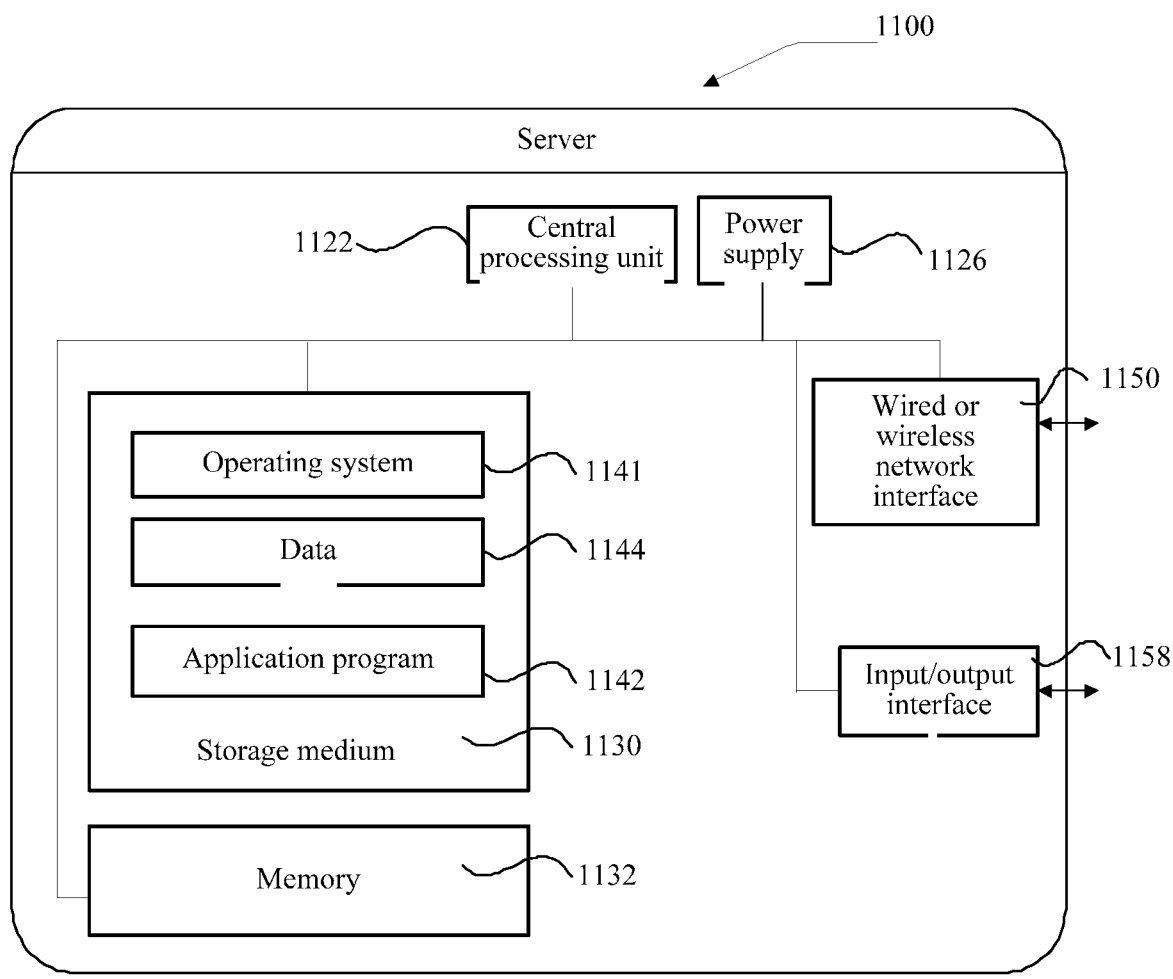
FIG. 6 is a structural diagram of a server according to an embodiment.

FIG. 6 is a structural diagram of a server according to an embodiment The implementation of the server 1100 may vary greatly due to different configurations or performance settings, and may include one or more CPUs 1122 (for example, one or more processors), a memory 1132, and one or more storage mediums 1130 (for example, one or more mass storage devices) that store an application program 1142 or data 1144. The memory 1132 and the storage medium 1130 may be volatile or non-volatile storages. A program stored in the storage medium 1130 may include one or more modules (not shown), and each module may include a series of instructions that specify operations to be performed by the server. Still further, the CPU 1122 may be configured to communicate with the storage medium 1130, and execute, on the server 1100, the series of instructions in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Linux™, or FreeBSD™.

In some embodiments, various operations as described in the foregoing embodiments can be performed by the server shown in FIG. 6.

Steps of the methods or algorithms described with reference to the content disclosed in the present disclosure may be implemented as processing circuitry by hardware, or may be implemented by a processor executing a software instruction. The software instruction may be constituted by corresponding software modules, and the software modules may be stored in a RAM, a flash, a ROM, an EPROM, an EEPROM, a register, a hard disk, a removable hard disk, a CD-ROM, or any other storage medium known in the art. An exemplary storage medium is coupled to a processor, so that the processor can read information from the storage medium and write information to the storage medium. Of course, in some embodiments, the storage medium may be a part of the processor. The processor and the storage medium may be located in the ASIC. In addition, the ASIC may be located in user equipment. Of course, in some embodiments, the processor and the storage medium may be used as discrete components existing in the user equipment.

A person skilled in the art should be aware that in the foregoing one or more examples, functions described in the present disclosure may be implemented by using hardware, software, firmware or any combination thereof. When implemented by software, the functions may be stored in a computer readable medium or transmitted as one or more instructions or code in a non-transitory computer readable medium. The computer readable medium includes a computer storage medium and a communications medium, where the communications medium includes any medium that enables a computer program to be transmitted from one place to another. The storage medium may be any available medium accessible by a general-purpose or special-purpose computer.

The objective, technical solutions, and/or beneficial effects of the present disclosure have been illustrated above using carious embodiments as non-limiting examples. It should be understood that the foregoing descriptions are merely examples of the present disclosure, but are not intended to limit the protection scope of the present disclosure. Any modification, equivalent replacement, or improvement made based on the technical solutions in the present disclosure shall fall within the protection scope of the present disclosure.

What is claimed is:

1. A method of adjusting a resource competition bidding threshold for qualifying resource competition participants, the method comprising:

obtaining, by processing circuitry, first competition data associated with a first competition for a first resource that corresponds to using at least a presentation resource during a first time period;

determining, by the processing circuitry, a first optimal bidding threshold according to the first competition data, and setting the resource competition bidding threshold according to the first optimal bidding threshold, the first competition data including bids placed by first resource competition participants participating in the first competition for the first resource;

obtaining, by the processing circuitry, second competition data associated with a second competition for a second resource that corresponds to using at least the presentation resource during a second time period;

determining, by the processing circuitry, a second optimal bidding threshold according to the second competition data, the second competition being conducted according to the set resource competition bidding threshold, and the second competition data including bids placed by second resource competition participants participating in the second competition for the second resource; and in response to a difference between the second optimal bidding threshold and the resource competition bidding threshold being greater than a difference threshold, performing:

obtaining, by the processing circuitry, third competition data associated with a third competition for a third resource that corresponds to using at least the presentation resource during a third time period, the third competition being conducted according to the set resource competition bidding threshold, the third competition data including bids placed by third resource competition participants participating in the third competition for the third resource;

determining, by the processing circuitry, a third optimal bidding threshold according to the third competition data; and updating, by the processing circuitry, the resource competition bidding threshold according to the third optimal bidding threshold the updated resource competition bidding threshold being applicable to a next resource competition for a next resource that corresponds to using at least the presentation resource during a next time period after the third time period, wherein an end moment of the first time period is earlier than an end moment of the second time period, the third time period at least partially overlaps the second time period, and the determining the third optimal bidding threshold according to the third competition data comprises:

dividing the third competition data into N data sets, N being a positive integer greater than 1;

assigning N different candidate resource competition thresholds to the N data sets, respectively;

determining candidate data sets from the N data sets;

calculating, for each one of the candidate data sets based on a corresponding candidate resource competition threshold, an overall competition benefit value of the respective candidate data set; and determining one of the candidate resource competition thresholds that corresponds to a greatest overall competition benefit value as the third optimal bidding threshold.

2. The method according to claim 1, wherein the third time period includes a subset of the second time period, the third resource includes a subset of the second resource, and the third competition data includes a subset of the second competition data.

3. The method according to claim 1, wherein the determining the first optimal bidding threshold according to the first competition data comprises:

calculating, based on the first competition data, competition benefit values corresponding to the first resource according to the candidate resource competition thresholds; and determining one of the different candidate resource competition thresholds that corresponds to a greatest competition benefit value as the first optimal bidding threshold.

4. The method according to claim 1, wherein the determining the candidate data sets comprises:

calculating, based on an $i^{th}$ candidate resource competition threshold of the N candidate resource competition thresholds, benefit influence related data of an $i^{th}$ data set of the N data set, i being a positive integer ranging from 1 to N; and determining that the $i^{th}$ data set is one of the candidate data sets when the benefit influence related data of the $i^{th}$ data set satisfies a constraint condition.

5. The method according to claim 1, wherein the first resource includes a plurality of presentation resources that are usable during the first time period, the first competition data associated with the first competition for the presentation resources includes competition behavior data of the first resource competition participants participating in competition for the plurality of presentation resources; and the competition behavior data of each one of the first resource competition participants includes a user identifier of the resource competition participant, and a media file identifier and a resource competition parameter associated with the user identifier.

6. The method according to claim 1, wherein the third resource includes a plurality of presentation resources that are usable during the third time period, and the calculating, for each one of the candidate data sets based on the corresponding candidate resource competition threshold, the overall competition benefit value of the candidate data set comprises:

calculating, based on the candidate resource competition threshold corresponding to the candidate data set, competition benefit values corresponding to the presentation resources; and performing a summation operation on the competition benefit values corresponding to the presentation resources, to obtain the overall competition benefit value of the candidate data set.

7. The method according to claim 6, wherein the candidate data sets includes a particular candidate data set, the candidate resource competition threshold corresponding to the particular candidate data set includes a target threshold, and the method comprises calculating a competition benefit value corresponding to a particular presentation source of the plurality of presentation resources for the particular candidate data set by:

filtering competition behavior data of resource competition participants competing for the particular presentation resource to obtain a competition behavior data subset, the competition behavior data subset including competition behavior data of resource competition participants whose resource competition parameter is greater than or equal to the target threshold;

calculating an effective cost per mile (ecpm) of each media file in the competition behavior data subset; and calculating an expected benefit value for the media file having a greatest ecpm, and using the calculated expected benefit value as the competition benefit value corresponding to the particular presentation resource.

8. The method according to claim 1, wherein the determining the second optimal bidding threshold according to the second competition data comprises:

calculating probability distribution and a probability density of a quality factor corresponding to the second resource competition participants according to the second competition data; and calculating the second optimal bidding threshold according to the probability distribution and the probability density.

9. An apt ara for adjusting a resource competition bidding threshold for qualifying resource competition participants, the apparatus comprising:

processing circuitry configured to:

obtain first competition data associated with a first competition for a first that corresponds to using at least a presentation resource during a first time period;

determine a first optimal bidding threshold according to the first competition data, and set the resource competition bidding threshold according to the first optimal bidding threshold, the first competition data including bids placed by first resource competition participants participating in the first competition for the first resource;

obtain second competition data associated with a second competition for a second resource that corresponds to using at least the presentation resource during a second time period;

determine a second optimal bidding threshold according to the second competition data, the second competition being conducted according to the set resource competition bidding threshold, and the second competition data including bids placed by second resource competition participants participating in the second competition for the second resource; and in response to a difference between the second optimal bidding threshold and the resource competition bidding threshold being greater than a difference threshold, perform:

obtaining third competition data associated with a third competition for a third resource that corresponds to using at least the presentation resource during a third time period, the third competition being conducted according to the set resource competition bidding threshold, the third competition data including bids placed by third resource competition participants participating in the third competition for the third resource;

determining a third optimal bidding threshold according to the third competition data; and updating the resource competition bidding threshold according to the third optimal bidding threshold, the updated resource competition bidding threshold being applicable to a next resource competition for a next resource that corresponds to using at least the presentation resource during a next time period after the third time period, wherein an end moment of the first time period is earlier than an end moment of the second time period, the third time period at least partially overlaps the second time period, and the processing circuitry is further configured to:
divide the third competition data into N data sets, N being a positive integer greater than 1;
assign N different candidate resource competition thresholds to the N data sets, respectively;
determine candidate data sets from the N data sets;
calculate, for each one of the candidate data sets based on a corresponding candidate resource competition threshold, an overall competition benefit value of the respective candidate data set; and
determine one of the candidate resource competition thresholds that corresponds to a greatest overall competition benefit value as the third optimal bidding threshold.

10. The apparatus according to claim 9, wherein
the third time period includes a subset of the second time period,
the third resource includes a subset of the second resource, and
the third competition data includes a subset of the second competition data.

11. The apparatus according to claim 9, wherein the processing circuitry is further configured to:
calculate, based on the first competition data, competition benefit values corresponding to the first resource according to for the candidate resource competition thresholds; and
determine one of the different candidate resource competition thresholds that corresponds to a greatest competition benefit value as the first optimal bidding threshold.

12. The apparatus according to claim 9, wherein the processing circuitry is further configured to:
calculate, based on an $i^{th}$ candidate resource competition threshold of the N candidate resource competition thresholds, benefit influence related data of an $i^{th}$ data set of the N data set, i being a positive integer ranging from 1 to N; and
determine that the $i^{th}$ data set is one of the candidate data sets when the benefit influence related data of the $i^{th}$ data set satisfies a constraint condition.

13. The apparatus according to claim 9, wherein the processing circuitry is further configured to:
calculate probability distribution and a probability density of a quality factor corresponding to the second resource competition participants according to the second competition data; and
calculate the second optimal bidding threshold according to the probability distribution and the probability density.

14. A non-transitory computer-readable storage medium storing computer-readable instructions, which when executed by a processor, cause the processor to perform a method of adjusting a resource competition bidding threshold for qualifying resource competition participants, and the method comprises:

obtaining first competition data associated with a first competition for a first resource that corresponds to using at least a presentation resource during a first time period;

determining a first optimal bidding threshold according to the first competition data, and setting the resource competition bidding threshold according to the first optimal bidding threshold, the first competition data including bids placed by first resource competition participants participating in the first competition for the first resource;

obtaining second competition data associated with a second competition for a second resource that corresponds to using at least the presentation resource during a second time period;

determining a second optimal bidding threshold according to the second competition data, the second competition being conducted according to the set resource competition bidding threshold, and the second competition data including bids placed by second resource competition participants participating in the second competition fbr the second resource; and in response to a difference between the second optimal bidding threshold and the resource competition bidding threshold being greater than a difference threshold, perfuming:

obtaining third competition data associated with third competition for a third resource that corresponds to using at least the presentation resource during a third time period, the third competition being conducted according to the set resource competition bidding threshold, the third competition data including bids placed by third resource competition participants participating in the third competition for the third resource;

determining a third optimal bidding threshold according to the third competition data; and updating the resource competition bidding threshold according to the third optimal bidding threshold, the updated resource competition bidding threshold being applicable to a next resource competition for a next resource that corresponds to using at least the presentation resource during a next time period after the third time period, wherein an end moment of the first time period is earlier than an end moment of the second time period, the third time period at least partially overlaps the second time period, and the determining the third optimal bidding threshold according to the third competition data comprises:

dividing the third competition data into N data, sets, N being a positive integer greater than 1;

assigning, N different candidate resource competition thresholds to the N data sets, respectively;

determining candidate data sets from the N data sets;

calculating, for each one of the candidate data sets based on a corresponding candidate resource competition threshold, an overall competition benefit value of the respective candidate data set; and determining one of the candidate resource competition thresholds that corresponds to a greatest overall competition benefit value as the third optimal bidding threshold.

15. The non-transitory computer-readable storage medium according to claim 14, wherein the third time period includes a subset of the second time period, the third resource includes a subset of the second resource, and the third competition data includes a subset of the second competition data.

16. The non-transitory computer-readable storage medium according to claim 14, wherein the determining the first optimal bidding threshold according to the first competition data comprises:

calculating, based on the first competition data, competition benefit values corresponding to the first resource according to the candidate resource competition thresholds; and determining one of the different candidate resource competition thresholds that corresponds to a greatest competition benefit value as the first optimal bidding threshold.

17. The non-transitory computer-readable storage medium according to claim 14, wherein the determining the candidate data sets comprises:

calculating, based on an $i^{th}$ candidate resource competition threshold of the N candidate resource competition thresholds, benefit influence related data of an $i^{th}$ data set of the N data set, i being a positive integer ranging from 1 to N; and determining that the $i^{th}$ data set is one of the candidate data sets when the benefit influence related data of the $i^{th}$ data set satisfies a constraint condition.

18. The non-transitory computer-readable storage medium according to claim 14, wherein the determining the second optimal bidding threshold according to the second competition data comprises:

calculating probability distribution and a probability density of a quality factor corresponding to the second resource competition participants according to the second competition data; and calculating the second optimal bidding threshold according to the probability distribution and the probability density.

19. The non-transitory computer-readable storage medium according to claim 14, wherein the third resource includes a plurality of presentation resources that are usable during the third time period, and the calculating, for each one of the candidate data sets based on the corresponding candidate resource competition threshold, the overall competition benefit value of the candidate data set comprises:

calculating, based on the candidate resource competition threshold corresponding to the candidate data set, competition benefit values corresponding to the presentation resources; and performing a summation operation on the competition benefit values corresponding to the presentation resources, to obtain the overall competition benefit value of the candidate data set.

20. The apparatus according to claim 9, wherein the third resource includes a plurality of presentation resources that are usable during the third time period, and the processing circuitry is further configured to calculate, for each one of the candidate data sets based on the corresponding candidate resource competition threshold, the overall competition benefit value of the candidate data set by:

calculating, based on the candidate resource competition threshold corresponding to the candidate data set, competition benefit values corresponding to the presentation resources; and performing a summation operation on the competition benefit values corresponding to the presentation resources, to obtain the overall competition benefit value of the candidate data set.

* * * * *